United States Patent
Bansal et al.

(10) Patent No.: US 9,471,213 B2
(45) Date of Patent: *Oct. 18, 2016

(54) CHAINING APPLICATIONS

(71) Applicant: International Business Machines Corporation, Armonk, NY (US)

(72) Inventors: Anju Bansal, San Jose, CA (US); Sunil Bharadwaj, Portland, OR (US); Raghuram R. Velega, San Jose, CA (US); Shankar Venkataraman, Fremont, CA (US); Chitra Venkatramani, Roslyn Heights, NY (US); Rohit S. Wagle, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/485,442

(22) Filed: Sep. 12, 2014

(65) Prior Publication Data
US 2015/0007084 A1    Jan. 1, 2015

Related U.S. Application Data

(63) Continuation of application No. 13/845,853, filed on Mar. 18, 2013.

(51) Int. Cl.
*G06F 3/0484* (2013.01)
*G06F 9/44* (2006.01)
(Continued)

(52) U.S. Cl.
CPC ........ *G06F 3/04847* (2013.01); *G06F 3/04842* (2013.01); *G06F 8/35* (2013.01); *G06F 8/20* (2013.01); *G06F 11/323* (2013.01); *G06F 11/3419* (2013.01); *G06F 17/30557* (2013.01); *G06F 2201/865* (2013.01)

(58) Field of Classification Search
None
See application file for complete search history.

(56) References Cited

U.S. PATENT DOCUMENTS 5,793,369 A * 8/1998 Atkins ................ G06F 3/04847
714/E11.181

(Continued)

OTHER PUBLICATIONS

Brown, R., A Distributed Program Composition System, NASA Ames Research Center, RIACS—Technical Report—89.6, Feb. 1989, 132 pages, [retrieved on Jun. 9, 2016], Retrieved from the Internet: <URL:http://ntrs.nasa.gov/archive/nasa/casi.ntrs.nasa.gov/19900014595.pdf>.*

(Continued)

*Primary Examiner* — Thuy Dao
*Assistant Examiner* — Geoffrey St Leger
(74) *Attorney, Agent, or Firm* — Patterson + Sheridan, LLP

(57) ABSTRACT

Method, system, and computer program product to enforce application dependencies, by building a data model based on inputs specifying relationships between a plurality of applications, generating, based on the data model, a list of candidate executions for a first application having a specified relationship with a second application, and outputting a visual representation of the data model, the visual representation comprising a plurality of objects representing the plurality of applications and arranged to represent the relationships between the applications, the list of candidate executions, and one or more user interface elements allowing user navigation between the first application and the second application, of the list of candidate executions.

6 Claims, 5 Drawing Sheets

(51) Int. Cl.
  *G06F 11/32* (2006.01)
  *G06F 11/34* (2006.01)
  *G06F 17/30* (2006.01)

(56) References Cited

U.S. PATENT DOCUMENTS

| | | | | |
|---|---|---|---|---|
| 6,938,245 | B1* | 8/2005 | Spertus | G06F 11/3664 714/38.14 |
| 7,032,229 | B1* | 4/2006 | Flores | G06F 11/3419 709/224 |
| 7,543,283 | B2 | 6/2009 | Luk et al. | |
| 8,751,524 | B2* | 6/2014 | Futty | G06Q 30/06 707/769 |
| 8,782,614 | B2* | 7/2014 | Basak | G06F 11/323 717/132 |
| 8,898,314 | B2* | 11/2014 | Cochran | G06F 9/54 709/225 |
| 9,098,612 | B2* | 8/2015 | Malkiman | G06F 11/3419 |
| 2004/0039728 | A1* | 2/2004 | Fenlon | H04L 12/2602 |
| 2004/0073899 | A1 | 4/2004 | Luk et al. | |
| 2007/0113183 | A1* | 5/2007 | Brinkmann | G06F 3/04847 715/723 |
| 2008/0005752 | A1* | 1/2008 | Morris | G06F 9/45512 719/331 |
| 2009/0094552 | A1* | 4/2009 | Watson | G06F 3/04842 715/804 |
| 2009/0235241 | A1 | 9/2009 | Luk et al. | |
| 2011/0119651 | A1* | 5/2011 | Utschig-Utschig | G06F 8/35 717/107 |
| 2012/0109999 | A1* | 5/2012 | Futty | G06Q 30/06 707/769 |
| 2012/0174120 | A1* | 7/2012 | Malkiman | G06F 11/3419 719/313 |
| 2012/0260135 | A1* | 10/2012 | Beck | G06F 11/323 714/45 |
| 2012/0260236 | A1* | 10/2012 | Basak | G06F 11/323 717/132 |
| 2013/0254411 | A1* | 9/2013 | Cochran | G06F 9/54 709/228 |
| 2013/0262527 | A1* | 10/2013 | Hunter | G06F 3/0481 707/805 |
| 2016/0034157 | A1* | 2/2016 | Vranjes | G06F 3/04847 715/798 |

OTHER PUBLICATIONS

Bharat, K., et al., Building Distributed, Multi-User Applications by Direct Manipulation, UIST '94 Proceedings of the 7th annual ACM symposium on User interface software and technology, 1994, pp. 71-80, [retrieved on Jun. 9, 2016], Retrieved from the Internet: <URL:http://dl.acm.org/>.*

El-Hafez, Hisham Abd et al., IBM ILOG Visualization Integration Scenarios, Redbooks, Feb. 2011, pp. 1-100, IBM Corp., Armonk, United States.

El-Hafez, Hisham Abd et al., IBM ILOG Visualization Integration Scenarios, Redbooks, Feb. 2011, pp. 101-200, IBM Corp., Armonk, United States.

El-Hafez, Hisham Abd et al., IBM ILOG Visualization Integration Scenarios, Redbooks, Feb. 2011, pp. 201-312, IBM Corp., Armonk, United States.

IBM, Automatic analysis of PSB/DBD associations for determining PSB run-time parallelism and optimization, ip.com: Prior Art Database, Dec. 28, 2009, Fairport, United States.

IBM, Method of determining context information when navigating between webpages, ip.com: Prior Art Database, Dec. 9, 2008, Fairport, United States.

U.S. Appl. No. 13/845,853, entitled Chaining Applications, filed Mar. 18, 2013.

* cited by examiner

CHAINING APPLICATIONS

CROSS-REFERENCE TO RELATED APPLICATION

This application is a continuation of co-pending U.S. patent application Ser. No. 13/845,853, filed Mar. 18, 2013. The aforementioned related patent application is herein incorporated by reference in its entirety.

BACKGROUND

Embodiments disclosed herein relate to the field of computers and computer software. More specifically, embodiments disclosed herein relate to design-time and run-time chaining of big data applications and visualization and navigation through the chaining.

Analytics processing performed for "big data" platforms may involve several applications with different relationships existing between the applications. A "big data" application may be defined to be a software application that takes as input very large data sets, transforms the data, and generates an output. Each software application may have configuration metadata that may provide some semantics for the processing it performs. The relationships may include dependencies, which are used to indicate that one application may be dependent on another application. Stated differently, the output of one application may be the input of a different application, making the latter application dependent on the former. Example big data applications may include applications to ingest data from social media sources and place the data in a cluster, applications that construct unique entities of interest by looking at document level data, and applications that perform predictive analysis on data that has previously been transformed and aggregated.

Applications may be related to other applications, and may belong to categories of applications. Therefore, in addition to dependencies between applications A and B, an application may belong to a particular category of applications, such as SQL applications. Relationships may also be flow based, such that the output of one application is chained to the input of another application. For example, the inputs to a local analysis application may be the output of an ingest application. A run (an invocation of an application) of the local analysis application is therefore dependent on a run of the ingest application, such that each run of the local analysis application is related to a run of the ingest application. There may exist many to many relationships between these applications, and with a large number of applications and relationships, the model can be a complex forest model.

Data scientists may analyze big data applications to discover new use cases for the big data applications, which may involve a chained subset of the available big data applications. The data scientists may experiment with data analysis techniques by running the applications several times, making tweaks to the metadata for the applications, and sampling the output of the applications. Once the data scientist is satisfied with the metadata and results of the processing, the flow may be automated for operational use by data analysts. This process may continue as findings are made during operational phases, new use cases are discovered, and new data sources and analysis methods are discovered.

Existing automation frameworks to make the automation of work flows between the chained applications have not developed to the point of being sufficient to be applied in big data operations. During an initial configuration stage of the big data applications, data scientists perform a large number of runs of various applications, where the configuration is tweaked, and the output samples are obtained. During this phase, there is a need to conveniently specify the relationships between applications and visualize them (design-time chaining), and to be able to easily relate runs of applications and subsequently navigate through the related runs to be able to view metadata that was used for each run (run-time chaining). Embodiments disclosed herein describe solutions to address these shortcomings.

SUMMARY

Embodiments disclosed herein provide a method, system, and computer program product to enforce application dependencies, by building a data model based on inputs specifying relationships between a plurality of applications, generating, based on the data model, a list of candidate executions for a first application having a specified relationship with a second application, and outputting a visual representation of the data model, the visual representation comprising a plurality of objects representing the plurality of applications and arranged to represent the relationships between the applications, the list of candidate executions, and one or more user interface elements allowing user navigation between the first application and the second application, of the list of candidate executions.

DETAILED DESCRIPTION

Figure 1:
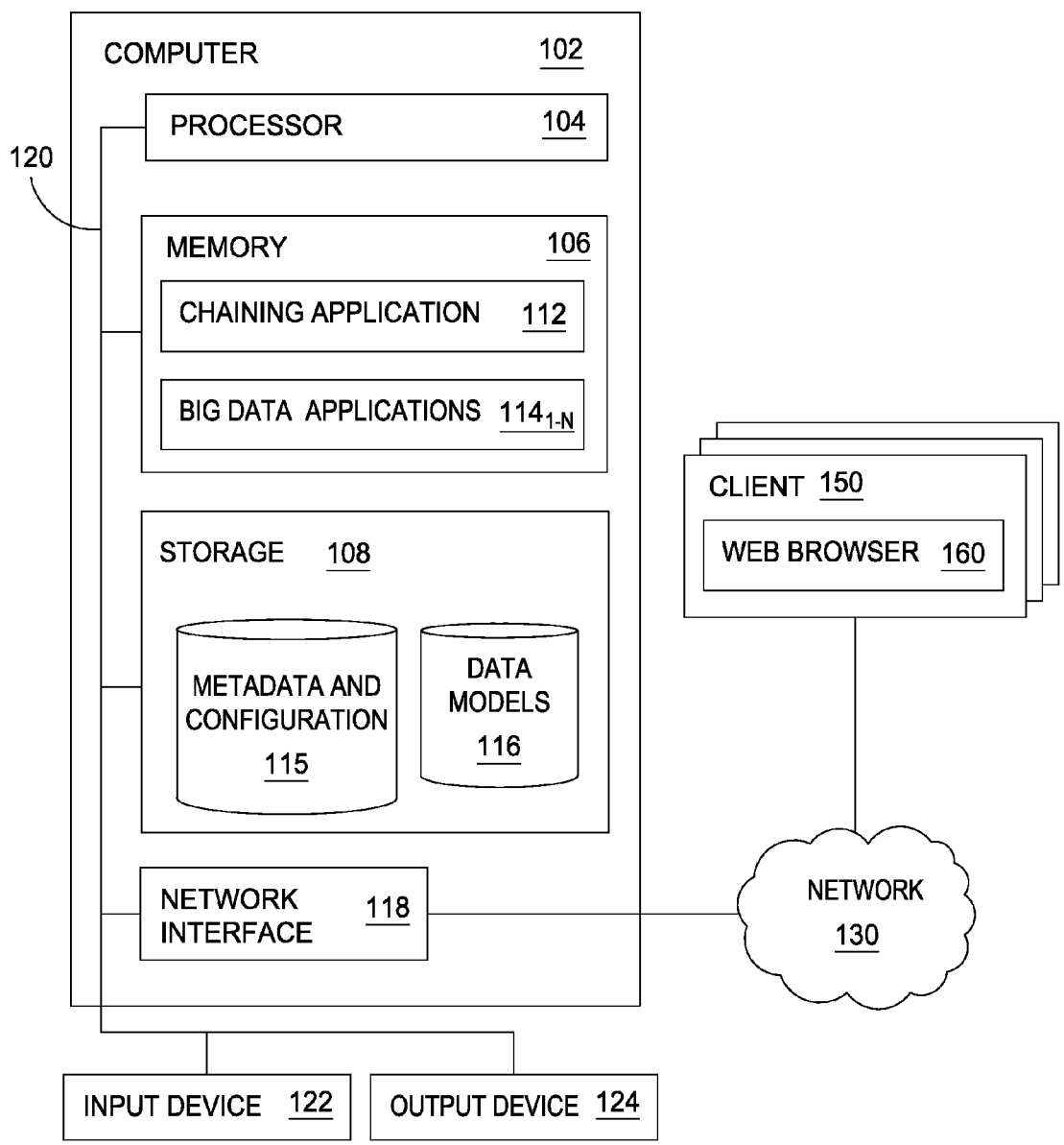
FIG. 1 is a block diagram illustrating a system for chaining applications, according to one embodiment disclosed herein.

Embodiments disclosed herein provide techniques to specify relationships between different big data applications, use the relationships to build a data model including each of the applications and their dependencies, and allow users to specify the relationships between runs (executions) by providing a list of candidate runs that can be picked by the user to specify relationships between runs. Finally, embodiments disclosed herein provide techniques to determine related runs for a run of an application, and provide a way to visualize the relationships and any associated metadata, allowing easy navigation through the runs. Embodiments disclosed herein provide representation and visualization of design-time and run-time chaining of applications so that users such as data scientists can efficiently and effectively harness the big data applications.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access chaining applications or related data available in the cloud. For example, the chaining application could execute on a computing system in the cloud and generate data models of a big data application platform. In such a case, the chaining application could generate data models and store the data models at a storage location in the cloud. Doing so allows a user to access this information from any computing system attached to a network connected to the cloud (e.g., the Internet).

FIG. 1 is a block diagram illustrating a system 100 for chaining applications, according to one embodiment disclosed herein. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

As shown, the memory 106 contains the chaining application 112, which is an application generally configured to provide design-time and run-time chaining of big data applications, and provide visualization and navigation through the chained big data applications, such as the big data applications $114_{1-N}$. The big data applications $114_{1-N}$ may be any big data application, including, but not limited to, ingestion applications, data placement applications, predictive analysis applications, and the like. A plurality of clients 150 may access the chaining application 112 through a web browser 160. As shown, storage 108 contains the metadata and configuration 115, which stores metadata and configuration data about the big data applications $114_{1-N}$, including application dependencies and categories. The storage 108 also includes the data models 116, which are representations of the dependencies between the different big data applications $114_{1-N}$. Although depicted as a database, the metadata and configuration 115 and data models 116 may take any form sufficient to store data, including text files, xml data files, and the like.

Figure 2:
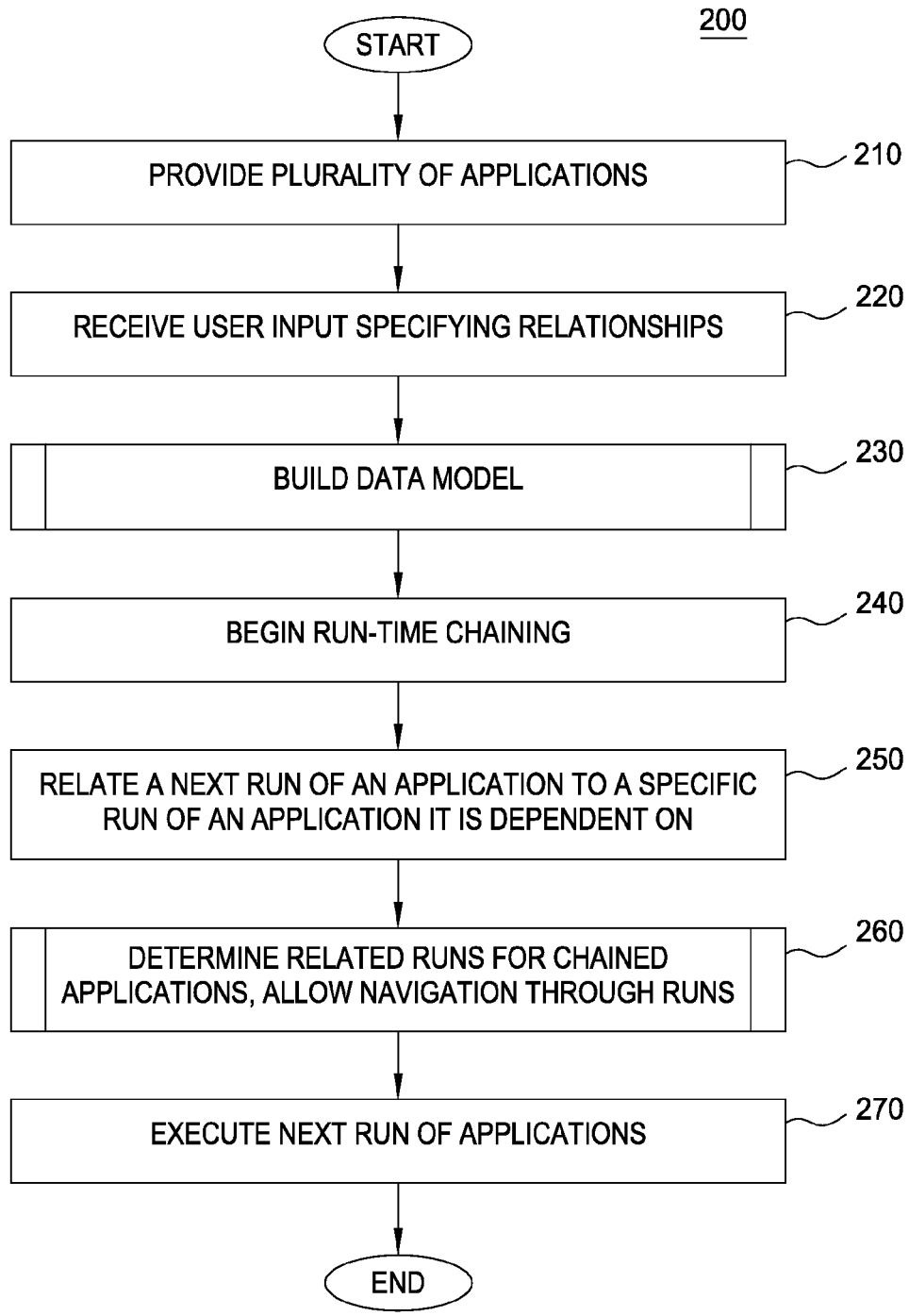
FIG. 2 is a flow chart illustrating a method for chaining applications, according to one embodiment disclosed herein.

FIG. 2 is a flow chart illustrating a method 200 for chaining applications, according to one embodiment disclosed herein. In one embodiment, the chaining application 112 performs the steps of the method 200. Generally, the method 200 allows a user to define application dependencies between big data applications $114_{1-N}$ in a big data processing platform. The dependencies may then used to create a data model of each application $114_{1-N}$ in the big data platform. Furthermore, the method 200 also allows a user to specify relationships between runs of chained applications, and navigate through the related runs.

At step 210, a plurality of big data applications $114_{1-N}$ are provided in the big data platform. The big data applications may include, but are not limited to, ingestion, placement, and analytics applications. At step 220, the chaining application 112 receives user input specifying application relationships. The relationships may specify that one application is dependent on another application. The relationships may also specify a category of applications that each application belongs to. In one embodiment, the user may input application relationships (or categories) in an appropriate metadata text field, which may then be stored in the metadata and configuration 115. The user may provide a text description (such as a name or other unique identifier) of the applications. For example, a user may specify that application X is dependent on application Y. In one embodiment, an application may be dependent on more than one application. In another embodiment, the user may be presented with a list of big data applications $114_{1-N}$ which may be selected by the user to define the relationships. Upon receiving selection of a particular application of the big data applications $114_{1-N}$, the chaining application 112 may generate textual dependency metadata, which may then be stored in the metadata and configuration 115. The input received for any given big data application $114_{1-N}$ at step 220, may, in one embodiment, be limited to the application it is immediately dependent on, such as the above example where application X is dependent on application Y. In such an embodiment, only parent/child relationships may be defined. However, in other embodiments, the names of all applications in the tree path that a given application is dependent on may be provided. If application Y depends on application Z, in such embodiments, the user input may therefore specify that application X is dependent on applications Y and Z. The chaining application 112, at step 220, may be configured to prevent looping of dependencies. For example, if application B has already been specified as dependent on application A, the user will not be able to specify that application A depends on application B. The chaining application 112 may perform this validation at all levels of dependencies, such that no loops exist anywhere in a chain of applications, not just immediate, first level dependencies.

At step 230, described in greater detail with reference to FIG. 3, the chaining application 112 may build a data model representing each of the big data applications $114_{1-N}$ and each of their dependencies. In one embodiment, the data model is rendered visually as a multi-level tree that depicts the many to many relationships between the applications. Generally, in generating the data model, the chaining application 112 produces a list of nodes having a type (or category) having a plurality of metadata attributes, which may include dependency information. Once step 230 has been completed, the "design-time" aspect of the chaining application 112 may be considered to be complete. At this point, users may create "runs" of big data applications, which may be specific executions of a chain of applications. Therefore, at step 240, run-time chaining of the big data applications $114_{1-N}$ may begin. In one embodiment, a user may create a new run for the applications, or select previously defined runs. At step 250, a next run of an application is related to a specific run of an application it is dependent on. At this step, the chaining application 112 may provide a list of candidate runs to the user for selection, which may be used to specify the relationships between runs of the applications. The chaining application 112 may generate the list, for a currently selected application in the multi-level tree generated at step 230, by iterating through the metadata of the currently selected application to identify a list of applications the currently selected application is dependent on. Then, the chaining application 112 may iterate through each of the list of dependent applications to identify a list of completed runs of those applications. Once the list of completed runs is identified, it is returned as the list of candidate runs to the user for selection. The list of candidate runs may also be stored in the metadata and configuration 115. By providing this functionality, the chaining application 112 may prevent the user from running the dependent application until the run is tied to a run of the application that it is dependent on (and may further prevent looping). At step 260, described in greater detail with reference to FIG. 4, the chaining application 112 may, for a selected application, may determine related runs for chained applications, and allow navigation through the related runs. This step may generally comprise generating a graphical user interface (GUI) which allows selection of a plurality of runs, which, when selected, displays metadata about each run. At step 270, the next run of the applications may be specified to be executed by the user.

Figure 3:
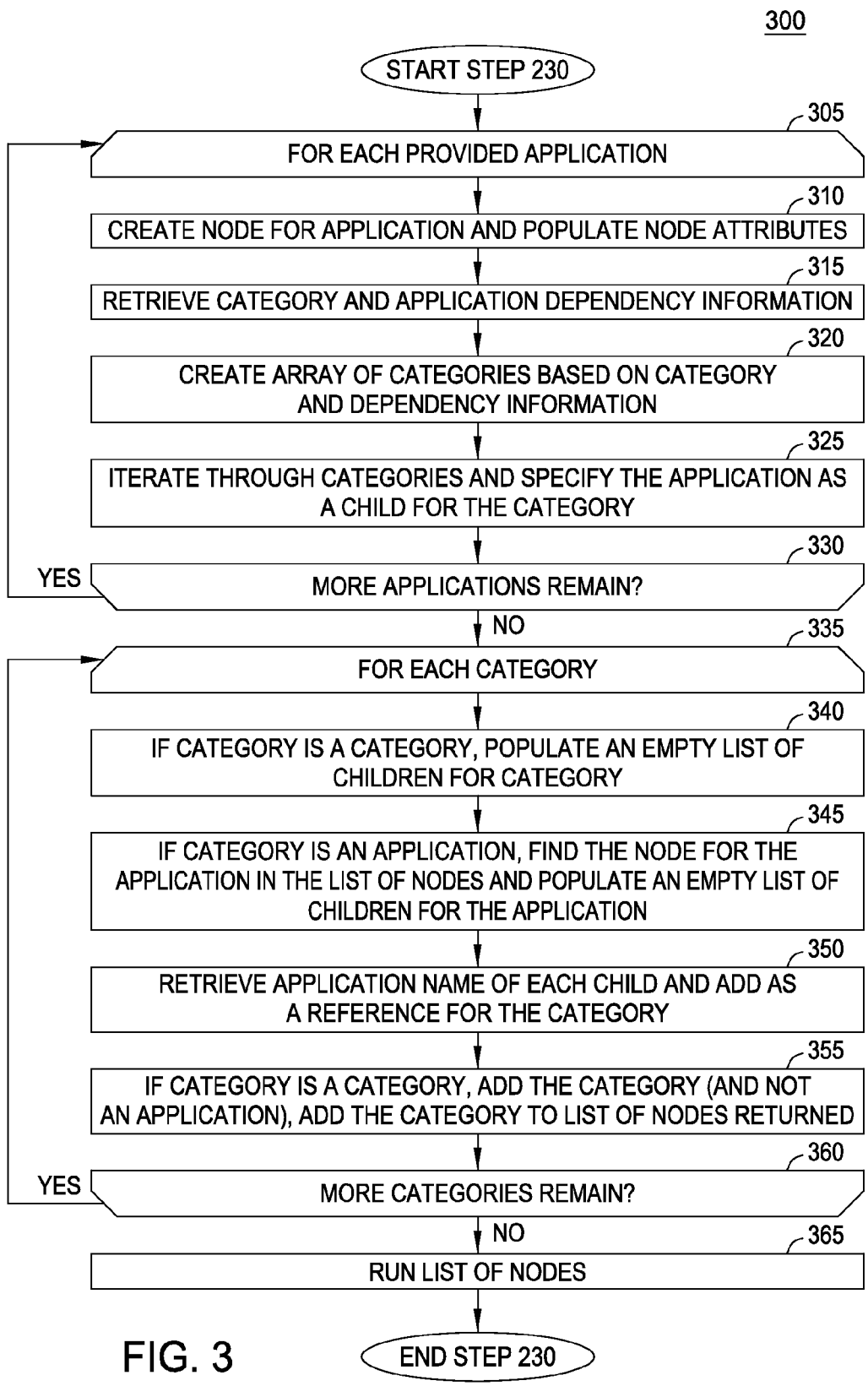
FIG. 3 is a flow chart illustrating a method to build a data model, according to one embodiment disclosed herein.

FIG. 3 is a flow chart illustrating a method 300 corresponding to step 230 to build a data model, according to one embodiment disclosed herein. Generally, the steps of the method 300 comprise generating a data model of each application in the big data applications $114_{1-N}$ based on the user dependency input received at step 220. In one embodiment, the steps of the method 300 are performed by the chaining application 112. At step 305, the chaining application 112 begins executing a loop including steps 310-330 for each provided big data application $114_{1-N}$. At step 310, the chaining application 112 creates a node for the current application, and populates node attributes. The node attributes may include a name, a description, and the like. At step 315, the chaining application 112 retrieves category and application dependency information about the current application. For example, the application may be an SQL application, and may be dependent on one other application. At step 320, the chaining application 112 creates an array of categories based on the category and dependency information for the current application. At step 325, the chaining application 112 iterates through each category, and specifies the current application as a child for the category. In one embodiment, the chaining application 112 creates a new child list to add the current application to the category. In another embodiment, the chaining application 112 appends the application information to an existing child list. At step 330, the chaining application 112 determines whether more applications in the big data applications $114_{1-N}$ remain to be analyzed. If more applications remain, the chaining application 112 returns to step 305. Otherwise, the chaining application 112 proceeds to step 335.

At step 335, the chaining application 112 begins executing a loop containing steps 340-360 for each category of application. At step 340, the chaining application 112 determines whether the category is in fact a category, instead of an application. If the category is a category, the chaining application 112 populates an empty list of children for the category. At step 345, if the category is an application, the chaining application 112 finds the node for the application in the list of nodes, and populates an empty list of children for the application. At step 350, the chaining application 112 retrieves the application name of each child and adds the child application name as a reference for the category. At step 355, if the category is a category, and not an application, the category is added to the list of nodes to be returned. At step 360, the chaining application 112 determines whether more categories remain. If more categories remain, the chaining application 112 returns to step 335. Otherwise, the chaining application 112 proceeds to step 365, where it returns a list of nodes, from which a visual representation may be generated. The list of nodes may be stored in the data models 116. An example list of nodes is provided here as Table I:

TABLE I

| Node Name | Type | Dependencies |
| --- | --- | --- |
| Lead Generation Retail | Category | Lead Generation Retail Driver |
| Lead Generation Retail | Application | Lead Generation Retail Ingest Decahose, Lead Generation Retail Ingest Powerpack |
| Lead Generation Retail Ingest Decahose | Application | Lead Generation Retail Local Analysis |
| Lead Generation Retail Ingest Powerpack | Application | Lead Generation Retail Local Analysis |
| Lead Generation Retail Local Analysis | Application | Lead Generation Retail Global Analysis |
| Lead Generation Retail Global Analysis | Application | Lead Generation Retail Realtime Analysis |
| Lead Generation Retail Realtime Analysis | Application | |

As shown, the list of nodes may have a type, which may be either an application or a category of applications. The dependencies column indicates which applications are dependent on the node. In Table I, a single category, Lead Generation Retail, is depicted. Additionally, a plurality of applications are depicted, each having a varying number of dependent applications. For example, the application Lead Generation Retail Realtime Analysis has no dependent applications, while the Lead Generation Retail application has two dependent applications, Lead Generation Retail Ingest Decahose, and Lead Generation Retail Ingest Powerpack. Advantageously, the list of nodes generated includes relationships between each application in the big data applications $114_{1-N}$, even though in one embodiment, only parent-child relationships were defined by the user. Based on the generated data model, a visual representation of the applications may be generated and outputted to the user.

Figure 4:
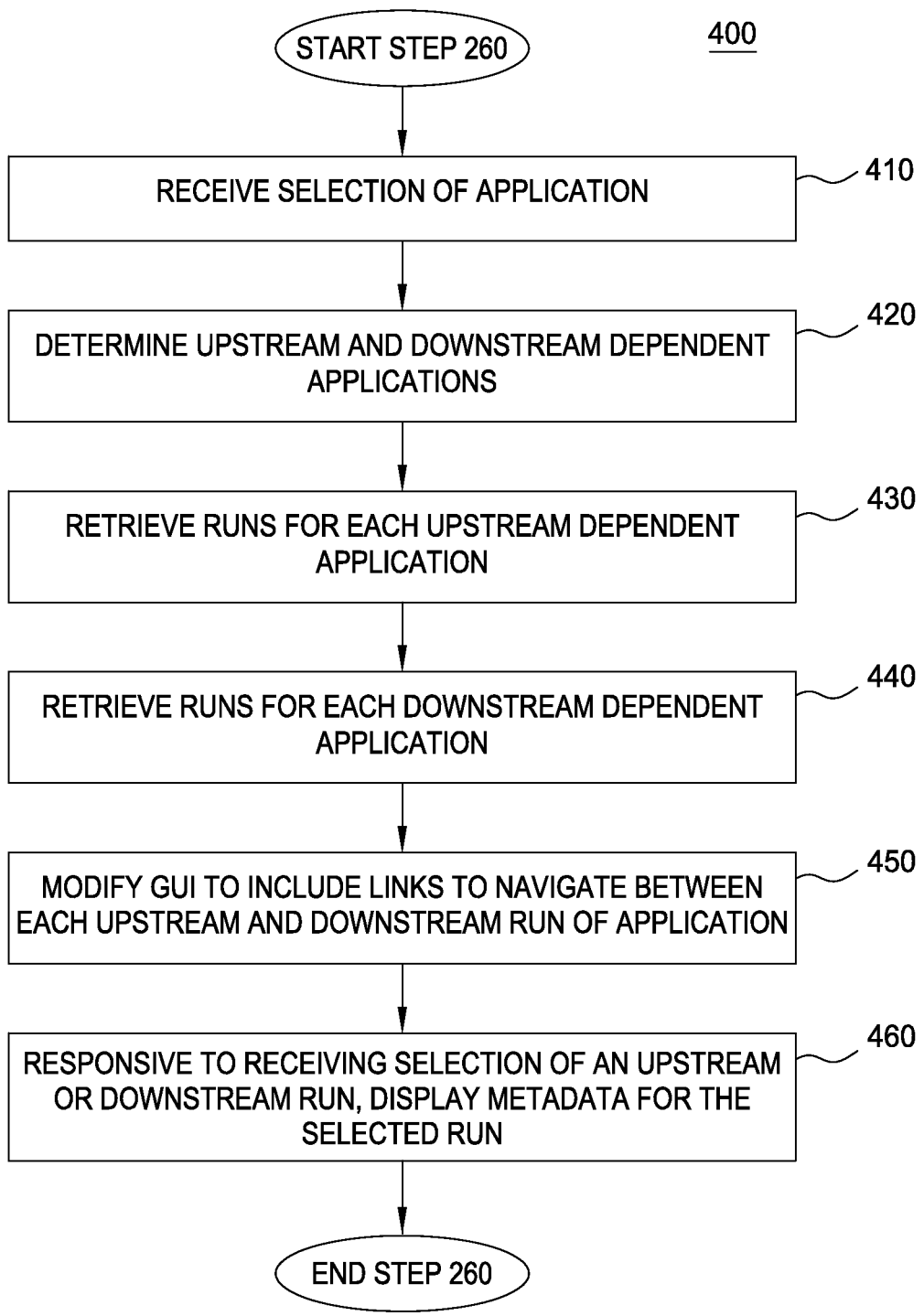
FIG. 4 is a flow chart illustrating a method to determine related runs for chained applications and allowing navigation through the runs, according to one embodiment disclosed herein.

FIG. 4 is a flow chart illustrating a method 400 corresponding to step 260 to determine related runs for chained applications and allowing navigation through the runs, according to one embodiment disclosed herein. In one embodiment, the steps of the method 400 are performed by the chaining application 112. Generally, the steps of the method 400 allow a user, who is interacting with a GUI displaying the application tree based on the generated data model, to select an application, view its metadata, and navigate through related runs of the application. At step 410, the chaining application 112 receives user selection, through the GUI, of a specific application. At step 420, the chaining application 112 determines upstream and downstream dependent applications for the selected application. The dependent applications may be determined based on analysis of the generated data model in the data models 116. An upstream dependent application may be considered a parent application to the selected application, i.e., the selected application is dependent on the upstream dependent application. A downstream dependent application is a child application, or an application that is dependent on the selected application. At step 430, the chaining application 112 retrieves from the metadata and configuration 115, the runs for each upstream dependent application. At step 440, the chaining application 112 retrieves from the metadata and configuration 115, the runs for each downstream dependent application. At step 450, the chaining application 112 may modify the GUI to include links that allow the user to navigate between each upstream and downstream runs of the selected application. At step 460, responsive to receiving selection of an upstream or downstream run, the chaining application 112 displays metadata for the selected run.

Figure 5:
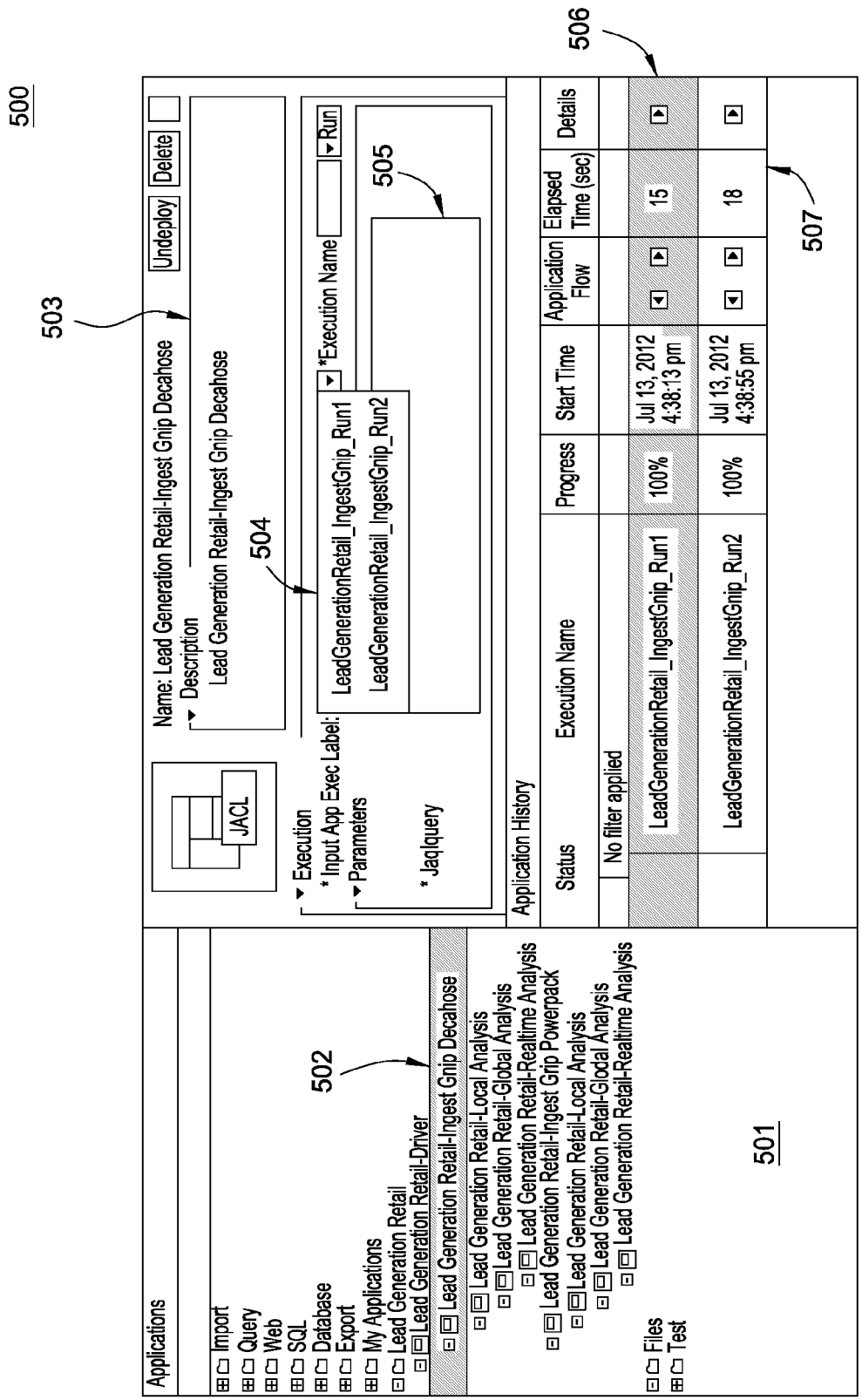
FIG. 5 is a diagram depicting a graphical user interface (GUI) for chaining applications, according to one embodiment disclosed herein.

FIG. 5 is a diagram depicting a graphical user interface (GUI) 500 for chaining applications, according to one embodiment disclosed herein. As shown, the GUI 500 includes an application tree 501, which displays the big data applications $114_{1-N}$ according to dependencies, such that a child application is underneath and indented from a parent application. As shown, the user has selected the application 502, Lead Generation Retail—Ingest Gnip Decahose, which has been highlighted to reflect the selection. Once the application has been selected, a plurality of metadata items are populated in the GUI 500. For example, a name region containing a description field 503 is provided, where a user may update the description of the application. An execution region includes an application execution label 504, which displays a list of two candidate runs for the selected application. A JAQL query field 505 allows a user to submit a query. Once a run is selected, the user may run the applications by selecting the Run button 509.

An application history tab displays information related to the candidate runs 506 of the application, which includes the execution name, a progress of the run, a start time of the run, an application flow with associated navigation tabs 507, and an elapsed time of the execution. Additionally, a details section includes icons 508, which, when selected, provide additional details related to the run. The application flow navigation tabs 507 are used by the user to navigate through the applications. For example, selecting the upstream tab (which may be predefined to be the left or the right tab) for the run "LeadGenerationRetail_IngestGnip_Run1" navigates to the related run "LeadGenerationRetail_Driver_Run1" for application "Lead Generation Retail Driver," and will also display of the metadata for that run. The Lead Generation Retail Driver application is displayed because it is the upstream parent of Lead Generation Retail—Ingest Gnip Decahose. Clicking the downstream tab for "LeadGenerationRetail_IngestGnip_Run1" navigates to the related run "LeadGenerationRetail_Driver_Run1" for the child application "Lead Generation Retail—Global Analysis," and will also display of the metadata for that run.

Embodiments disclosed herein provide techniques for design-time (at the time of installation) chaining of applications. Advantageously, the same representation method may be subsequently used during run-time configurations. Additionally, the run-time usage may be simplified by using a UI widget, for example. For each application that is chained to other applications, the user need only specify the one or more applications that the application is immediately dependent on. Embodiments disclosed herein may use this information to build a data model that can be visually rendered and displayed as part of a user interface. Visualization of the dependencies may be part of a multi-level hierarchical tree, such that the user can look at the relationships, and easily navigate through these relationships. Still yet, embodiments disclosed herein provide convenient techniques to specify relationships between runs of chained applications. When running an application that is dependent on another application, the user can tie the run of the application with a run of an application that it is dependent on. The list of candidate runs may be presented to the user to make it convenient to relate the runs. Furthermore, the applications may not be executed until a run of an application that they are dependent on is completed.

Embodiments disclosed herein advantageously associate metadata with each run, which may change over time. When applications are chained, it may be important for the user to be able to view the associated metadata for each run. With the number of applications and relationships growing larger and larger, it may be very useful to the user if he or he can navigate up and down the chain to view the metadata for each run. Finally, outputs of an application may be inputs for an application that is dependent on it (a child application). Embodiments disclosed herein may conveniently allow specification of such inputs for an application by displaying a list of identified relationships which may be selected by the user.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   receiving input specifying relationships between a plurality of applications, wherein the input includes a relationship specifying that a first application is dependent on a second application, wherein the input specifies, for each of the plurality of applications, a relationship between at least one of a parent application and a child application;

building a data model for each of the plurality of applications based on the input and the relationships between the at least one of the parent application and the child application of each of the plurality of applications;

generating, based on the data model, a list of candidate executions for the first application, wherein each instance of a dependency between the first and second applications in the list of candidate executions restricts the second application from being dependent on the first application based on the input by specifying that the first application is dependent on the second application and not specifying the second application being dependent on the first application; and outputting a visual representation of the data model, the visual representation comprising:
- a plurality of objects representing the plurality of applications and arranged to represent the relationships between the applications;
- the list of candidate executions;
- a progress indicator specifying a respective percentage each candidate execution has completed; and
- one or more directional buttons for each candidate execution, which when selected, provide navigation between the respective applications in the list of candidate executions.

2. The method of claim 1, wherein the plurality of objects representing the plurality of applications and the list of candidate executions are user-selectable and, upon being selected, reveal associated configuration metadata.

3. The method of claim 1, wherein each candidate execution, of the list of candidate executions, is further based on a respective prior execution of the first application and the second application.

4. The method of claim 3, wherein each prior execution includes a respective execution path for the candidate execution.

5. The method of claim 1, wherein the one or more directional buttons are further configured to allow a user selection to define an execution dependency between an execution of the second application and one or more candidate executions from the list of candidate executions.

6. The method of claim 1, wherein the plurality of objects represent a type of each of the plurality of applications comprising: (i) a category of applications, and (ii) an application, wherein the category of applications defines a class of applications, wherein the category of applications includes at least one child application, wherein the category of applications has no parent application.

* * * * *